(12) United States Patent
Willingham (10) Patent No.: US 8,726,556 B1
(45) Date of Patent: May 20, 2014

(54) FIREARM LOCATION TRACKING AND LOCATION-BASED ALERTS

(71) Applicant: Thomas O. Willingham, Hamilton, OH (US)

(72) Inventor: Thomas O. Willingham, Hamilton, OH (US)

( * ) Notice: Subject to any disclaimer, the term of this patent is extended or adjusted under 35 U.S.C. 154(b) by 0 days.

(21) Appl. No.: 13/914,962

(22) Filed: Jun. 11, 2013

(51) Int. Cl.
*F41A 17/06* (2006.01)
*F41A 17/44* (2006.01)

(52) U.S. Cl.
CPC ............... *F41A 17/06* (2013.01); *F41A 17/44* (2013.01)
USPC ........................... 42/70.11; 42/1.01; 42/49.01

(58) Field of Classification Search
USPC ............................... 42/1.01, 70.11; 340/568.1
See application file for complete search history.

(56) References Cited

U.S. PATENT DOCUMENTS

| | | | |
|---|---|---|---|
| 5,416,826 A | 5/1995 | Butler | |
| 6,400,269 B1 * | 6/2002 | Savastano | 340/568.1 |
| 6,568,116 B2 | 5/2003 | Hathaway | |
| 6,791,451 B1 | 9/2004 | Muise | |
| 6,918,519 B2 | 7/2005 | Vor Keller et al. | |
| 7,116,224 B2 | 10/2006 | Mickler | |
| 7,168,198 B2 | 1/2007 | Newkirk et al. | |
| 7,389,604 B2 | 6/2008 | Newkirk et al. | |
| 7,714,720 B2 | 5/2010 | Hietanen et al. | |
| 8,117,778 B2 * | 2/2012 | Clark et al. | 42/1.01 |
| 8,312,660 B1 * | 11/2012 | Fujisaki | 42/70.11 |
| 8,339,257 B2 * | 12/2012 | Cazanas et al. | 340/539.1 |
| 8,353,121 B2 * | 1/2013 | Clark et al. | 42/1.01 |
| 2002/0032976 A1 | 3/2002 | Riener | |
| 2006/0042142 A1 | 3/2006 | Sinha | |
| 2006/0223518 A1 * | 10/2006 | Haney | 455/420 |
| 2008/0079581 A1 * | 4/2008 | Price | 340/572.1 |
| 2010/0315235 A1 | 12/2010 | Adegoke et al. | |
| 2011/0079170 A1 * | 4/2011 | Al-Mutairi | 109/23 |
| 2011/0175730 A1 | 7/2011 | Stevenson | |
| 2012/0038505 A1 * | 2/2012 | Sullivan et al. | 342/90 |

OTHER PUBLICATIONS

"M14Forum.com", accessed Apr. 17, 2013 at http://m14forum.com/, Mar. 6, 2013, 3 pages.
Shane, Jeremy "Make Guns Smart", retrieved from www.cnn.com/2013/01/09/opinion/shane-smarter-guns/index.html on Apr. 17, 2013, Jan. 9, 2013, 5 pages.
"Smart Gun Article WTF", M14 Forum post by Buckingfastard; Retrieved from http://m14forum.com/gun-rights/129703-smart-gun-article-wtf.html on Apr. 17, 2013, Jan. 11, 2013, 6 pages.
Johnson, Steve "Wifi-enabled Gun Safe", retrieved from http://www.thefirearmblog.com/blog/2012/09/18/wifi-enabled-gun-safe/ on Apr. 17, 2013, Sep. 18, 2012, 3 pages.

* cited by examiner

*Primary Examiner* — Michael David
(74) *Attorney, Agent, or Firm* — Wolfe-SBMC (57) ABSTRACT

Various embodiments describe techniques for tracking a firearm and generating an alert when the firearm is outside a designated authorized location. In various embodiments, a location device, such as a Global Positioning System (GPS) receiver coupled to a transmitter, is affixed to and/or associated with a firearm. A location of the firearm is transmitted via the location device to a location service module. The location service module compares the location of the firearm to at least one designated authorized location and, responsive to determining that the location of the firearm is not within the designated authorized location, generates an alert. A firearm that includes a location device is also described.

20 Claims, 6 Drawing Sheets

FIREARM LOCATION TRACKING AND LOCATION-BASED ALERTS

BACKGROUND

The possibility that an unauthorized person, such as a child or a person with a mental health issue, may discover a firearm and either seriously injure themselves or another leads firearm owners to secure their firearms in an effort to prevent such an occurrence. Although locking a firearm in a safe may provide some level of protection, safes may not prevent those with the combination or access to the key from obtaining access to the firearm. Moreover, when a firearm is removed from a safe, whether by an authorized or unauthorized person, the owner may not be aware of the location of the firearm, despite having continued responsibility for the firearm.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments describe techniques for tracking a firearm and generating an alert when the firearm is outside a designated authorized location. In various embodiments, a location device, such as a Global Positioning System (GPS) receiver and/or transmitter, is affixed to or otherwise coupled to a firearm. The location of the firearm is transmitted to a location service module. The location service module compares the location of the firearm to at least one designated authorized location and, responsive to determining that the location of the firearm is not within the designated authorized location, generates an alert.

In various embodiments, the location of the firearm is transmitted to a location service server that is configured to compare the location of the firearm to at least one designated authorized location. Responsive to determining that the location of the firearm is not within the designated authorized location, the location service server transmits an alert to a location service module on a client device.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Figure 1:
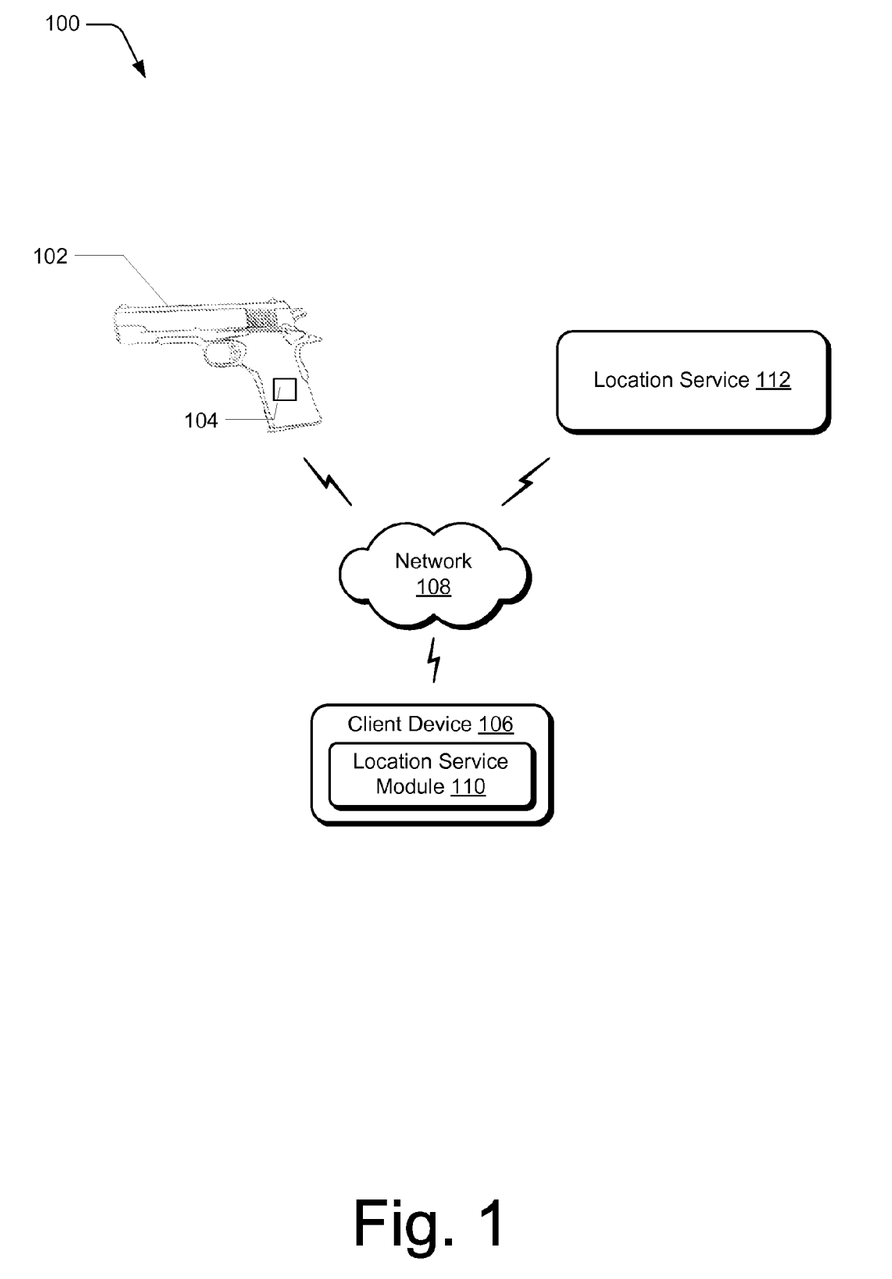
FIG. 1 is an illustration of an example environment in accordance with one or more embodiments.

FIG. 1 is an illustration of an example environment 100 in accordance with one or more embodiments. Environment 100 includes a firearm 102 that is communicatively coupled via a location device 104 to a client device 106 via a network 108. The network can be any suitable type of network, such as a local area network (LAN), a wide area network (WAN), a cellular network, the Internet, and so forth.

Client device 106 can be embodied as any suitable computing device, such as a desktop computer, a laptop computer or netbook, a cell phone, and the like. The client device 106 includes one or more applications, such as a location service module 110. The one or more applications and/or modules may be embodied on a computer-readable storage media, such as a computer-readable memory. In various embodiments, location service module 110 is configured to receive information regarding a current location of firearm 102, compare the current location of firearm 102 to a location designated as an authorized location, and generate an alert responsive to determining that the current location of firearm 102 is outside of the authorized location. In one or more embodiments, a determination that the location of firearm 102 is outside an authorized location is based on a designation of a location by its GPS coordinates. Such a system enables multiple authorized locations to be designated and enables a user to add and/or revoke authorization remotely via the location service module 110.

Authorized locations can be defined locations, such as a firearm owner's home, office building, or favorite gun range, or can be an authorized zone. Zones may be any area designated by the user, such a zone including the firearm owner's property, a zone including the firearm owner's home and neighbor's homes, or a zone that defines the path from the firearm owner's home to his place of work. In some embodiments, zones can reduce or even eliminate false notifications that can result from errors due to GPS precision or accuracy limitations, and provide the owner with greater flexibility over areas that can be authorized. Zones and locations may be defined by their GPS coordinates and may be authorized by the user via location service module 110. For instance, a user can define a zone with reference to an allowed distance (e.g., in feet, meters, and so on) from a particular location. A user may also define a zone with reference to a particular GPS zone, such as a quadrant and/or other coordinate-defined zone. According to one or more embodiments, a user can also alter authorized zones via a web application.

In various embodiments, the location device 104 is configured to transmit location information for the firearm 102 for receipt by the client device 106. For example, the location device 104 can be implemented as a GPS receiver coupled to a transmitter affixed to and/or embedded in firearm 102 and configured to transmit information regarding the location of firearm 102 to client device 106 as a text message, short message signal (SMS), mixed media signal (MMS), email, or type of message.

In at least some embodiments, location device 104 transmits information regarding the location to a location service 112 (e.g., via network 108), and location service 112 transmits the information to client device 106. In at least some embodiments, the location service 112 represents functionality (e.g., hardware, software, and so forth) for receiving and processing location information transmitted by the location device 104. The location service 112, for instance, can be embodied as a device that is situated locally to the firearm 102 and that is configured to receive signals transmitted by the location device 104, and process and/or transmit the signals for receipt by another resource, such as the client device 106 via the network 108. Although various embodiments are described as including a GPS receiver coupled to a transmitter, it is contemplated that location device 104 can include a GPS transmitter that can be configured in other ways to relay position data to other devices, such as a mobile phone or computer, such as via a serial connection, USB, or Bluetooth. Alternatively or additionally, the location device 104 can include other types of transmitting or emitting apparatus, such as radio frequency identification (RFID) hardware, a magnetic-based information transmitter, and so forth.

In various embodiments, location device 104 can be embedded in the grip of firearm 102. For example, an owner can remove the grip plate and place location device 104 in place before putting the grip plate back into position and securing the grip plate.

The location device 104 can additionally or alternatively be located elsewhere on firearm 102, according to one or more embodiments. For instance, a "dummy round" of ammunition can be loaded in the firearm 102, such as in a magazine, a clip, and so forth. The dummy round can include a location-transmitting apparatus, such as the location device 104.

Figure 2:
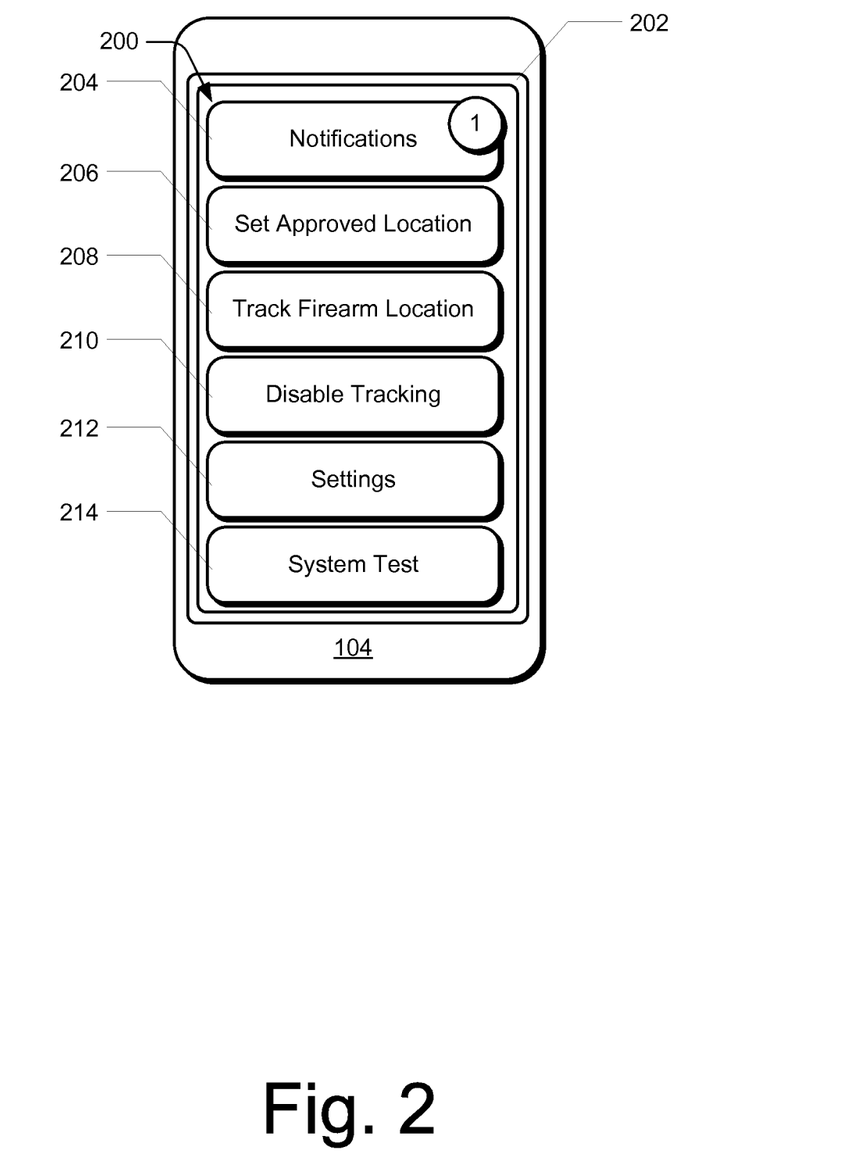
FIG. 2 is an illustration of an example user interface in accordance with one or more embodiments.

FIG. 2 is an illustration of an example user interface 200 through which a user can interact with location service module 110. In FIG. 2, client device 106 includes a display 202 on which various selectable controls are shown. The controls enable a user to interact with location service module 110, such as to input information, receive notifications, and cause location service module 110 to perform various functions.

For example, a notification control 204 is selectable to view notifications regarding the location of the firearm 102, such as a current notification and/or historical notifications. A set location control 206 is selectable to set an approved and/or disapproved locations for the firearm, such as a gun range where the user frequently uses the firearm. For instance, in response to selection of the set location control 206, a user can be presented with a different user interface via which the user can specify approved and/or disapproved zones for the firearm 102. As referenced above, a zone can be specified in a variety of ways, such as with reference to a coordinate radius for a specified location, a coordinate quadrant, and so forth.

A track location control 208 is further included, which is selectable to cause the location service module 110 to track a firearm location. For example, the track location control 208 can be selected to enable tracking functionality of the location service module 110 and/or the location service 112.

A disable tracking control 210 is selectable to disable tracking functionality of the location service module 110 and/or the location service 112. For instance, in response to selection of the disable tracking control 210, a user can be presented with an authentication procedure. Examples of an authentication procedure include a user interface for providing a username and/or password, a biometric authentication procedure, and so forth. If the user successfully authenticates, the user may be permitted to disable tracking functionality. Otherwise, if authentication fails, the user may not be permitted to disable tracking.

The user interface 200 further includes a settings control 212, which is selectable to enable a user to change settings, such as notification settings, location tracking settings, add and/or remove allowed user accounts, and so forth.

In at least some embodiments, a user can select the track location control 208 to cause the location service module 110 to track a firearm location. In response, a map can be displayed on display 202 indicating the location of the firearm. In at least some embodiments, a "bread crumb" trail can be shown on display 202 to indicate a location history for a firearm on the map.

Further illustrated is a system test control 214, which is selectable to initiate various system test procedures. For instance, selection of the system test control 214 can check that various functionalities of the location device 104, the location service module 110, and/or the location service 112 are functioning properly. A user can select the system test control 214, for example, to cause the location service module 110 to iterate through a set of test procedures that check whether the location device 104 is currently sending location information, whether the client device 106 and/or the location service 112 are receiving and/or correctly interpreting location information sent by the location device 104, and so forth. The location service module 110 can also generate "out of zone" test events that verify whether the system is generating alerts when a firearm is detected outside of an authorized zone. An out of zone test event, for example, can simulate a signal that corresponds to a firearm being detected outside of an authorized zone. Various other test procedures can be implemented in accordance with one or more embodiments.

Consider, as an example, the following scenario. Assume that an owner of a firearm uses a location service module, such as location service module 110, on the owner's mobile phone. The firearm has a location device affixed to it as discussed herein. For example, the location device can be located within the grip of the firearm or elsewhere on or within the firearm, in a visible or not visible location. The owner has set an approved location for the firearm that includes the owner's home such that when the firearm is removed from the owner's home, the owner will receive a notification on the mobile phone.

Further to this scenario, a burglar gains unauthorized entry into the owner's home and comes into possession of the firearm. The burglar, for example, may break into a safe in which the firearm is stored, or if the safe is small enough, may move the safe itself. When the burglar moves the firearm outside the owner's home (the approved location), an alert is generated that indicates that the firearm is outside of an approved zone. The location service 112, for instance, can detect that a signal from the location device 104 is being received from outside of an approved zone. In response, the location service can transmit an "out of zone" alert to the client device 106. In response, the location service module 110 can generate a user-detectable alert via the client device 106. For example, the location service module 110 can cause the owner's mobile phone to generate a vibratory or auditory notification to indicate that there is a message for the owner indicating that the firearm is outside of an approved zone. Based on this notification, the owner can make a decision regarding how to proceed. For example, the owner may decide to notify the police, track the location of the firearm, and so on.

Consider, as another example, the following scenario. Assume again that an owner of a firearm uses a location service module on his mobile phone. Assume this time, however, that the owner has teenage children at home. While the owner is at home, the teenager takes the firearm and leaves the home. Assuming that the owner of the firearm has set his home as an approved location, when the teenager leaves the home with the firearm, the owner receives a notification on his mobile phone. Knowing that the owner's teenager was at home, the owner can then decide to try to call the teenager himself, or can call the police and report that the teenager has taken the firearm without authorization.

While these example scenarios are discussed with reference to notifications received via a mobile phone, it is to be appreciated that notifications can be received via any suitable device.

Having described various scenarios in which the location service module 110 can be implemented, consider now the following methods for generating an alert.

Figure 3:
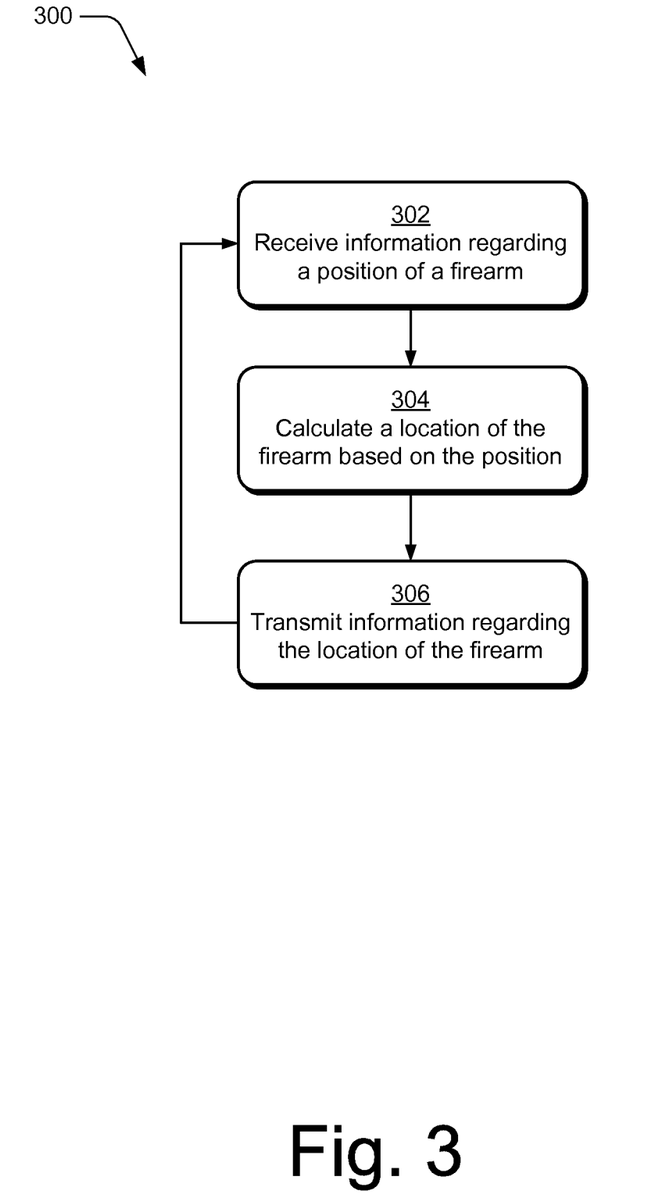
FIG. 3 is an example method for determining a location of a firearm in accordance with one or more embodiments.

FIG. 3 illustrates an example method 300 for determining a location of a firearm in accordance with one or more embodiments. The method may be implemented in firmware, software, hardware, or any combination thereof. In various embodiments, method 300 can be implemented by the location device 104, the location service module 110, the location service 112, and/or combinations thereof.

Step 302 receives information regarding a position of a firearm. Functionalities discussed herein, for example, can receive information regarding a position of the firearm 102. The position can be determined as GPS coordinates determined based on a signal received from a GPS satellite, and/or any other suitable location-determining mechanism. In embodiments where location is determined using technology other than GPS, information regarding the position can be received from the corresponding source.

Step 304 calculates a location of the firearm based on the position. In various embodiments, location device 104, the location service module 110, and/or the location service 112 calculates the location of the firearm 102 using triangulation and/or other suitable position-determining technique.

Step 306 transmits information regarding the location of the firearm. The location device 104 and/or the location service 112, for example, can transmit the information. The information can be transmitted directly to location service module 110 via the network 108, or it can be transmitted to location service 112, which then transmits the information to location service module 110. In one or more embodiments, the information transmitted can be the GPS coordinates of the firearm.

Figure 4:
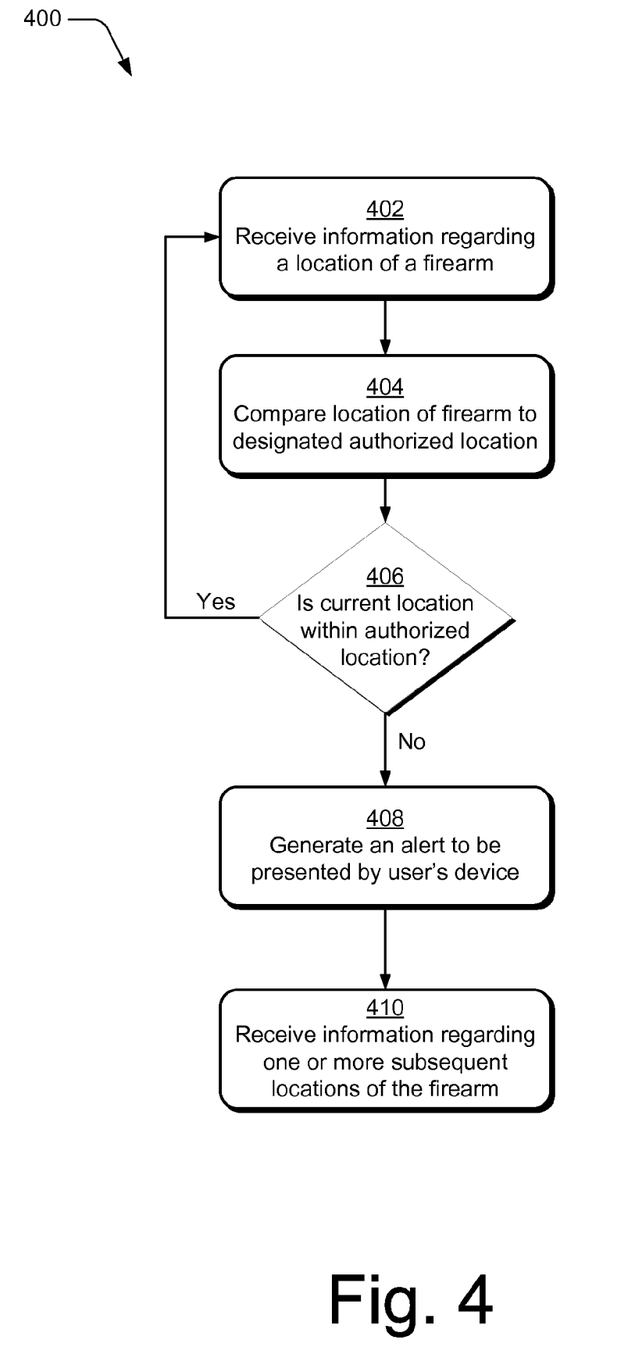
FIG. 4 is an example method for generating an alert in accordance with one or more embodiments.

FIG. 4 illustrates an example method 400 for generating an alert in accordance with one or more embodiments. The method may be implemented in firmware, software, hardware, or any combination thereof. In various embodiments, method 400 can be implemented by the location service module 110 and/or the location service 112.

Step 402 receives information regarding a location of a firearm. The location can correspond to a current location of the firearm, a previous location of the firearm, and so forth. For example, a location as determined above can be received by the location service module 110, the location service 112, and so forth.

Step 404 compares the location of the firearm to a designated authorized location. In various embodiments, one or more designated authorized locations can be identified, such as by the GPS coordinates of each location, and stored. Thus, the location of the firearm can be compared to multiple different authorized locations.

Step 406 ascertains whether the location of the firearm is within the authorized location.

If the location of the firearm is within an authorized location ("Yes")), the method returns to 402 to continue monitoring a location of the firearm.

If, however, the location of the firearm is not within an authorized location ("No"), step 408 generates an alert to be presented by the user's device. For example, the location service module 110 can generate various types of detectable alerts, e.g., an auditory alert, a vibratory alert, a visual alert on the display of the device, and so forth. The alert can take various other forms in accordance with one or more embodiments.

Step 410 receives information regarding one or more subsequent locations of the firearm. For example, as the firearm continues to be moved, the GPS receiver and transmitter can continuously or on a periodic basis, transmit information regarding the updated location of the firearm. The location information can be transmitted periodically, such as every thirty seconds, one minute, five minutes, and so on. The location service module can output the location information via the client device 106, thus enabling the firearm to be tracked and/or maintaining a history of locations of the firearm. As an example, the information can be displayed as a "bread crumb" trail on a map that illustrates the path of the firearm.

Figure 5:
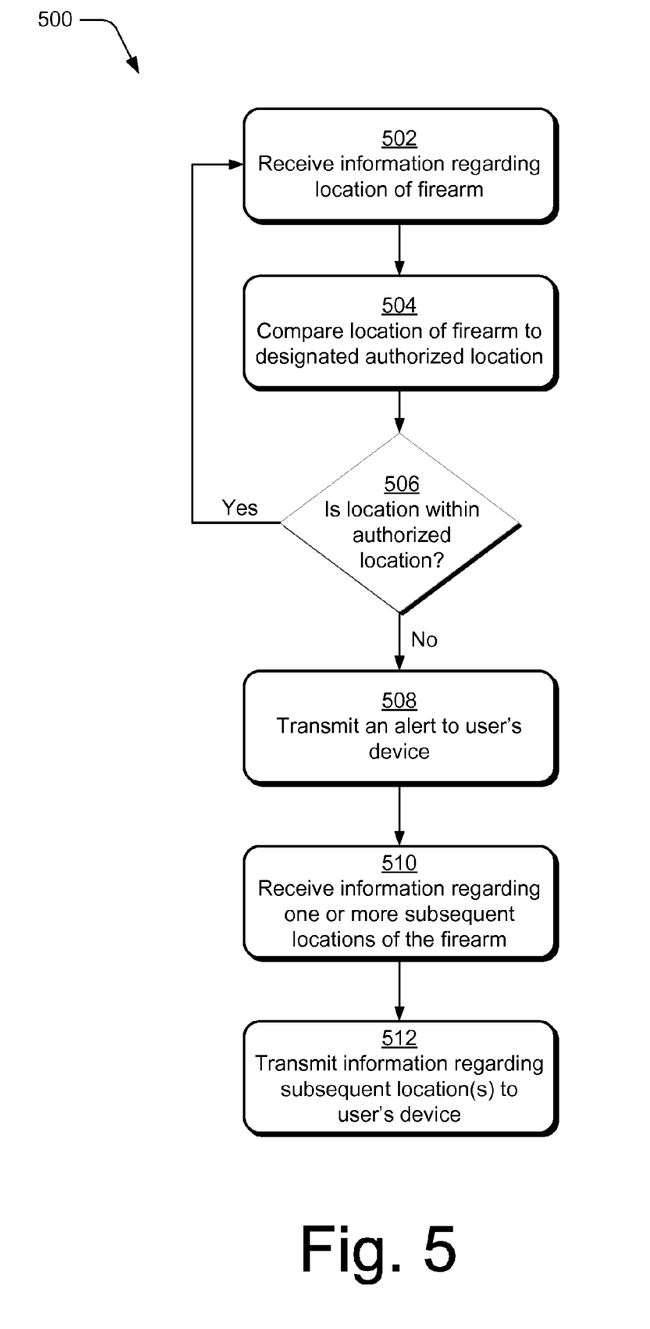
FIG. 5 is another example method for generating an alert in accordance with one or more embodiments.

In various embodiments, at least some of the functions can be performed by a location service server, such as location service server 110 in FIG. 1. For example, rather than transmitting the location of the firearm directly to the user's device, the location can be transmitted to the location service server that is configured to compare the current location of the firearm to designated authorized locations. FIG. 5 illustrates an example method 500 in which the location is transmitted to a location service server.

Step 502 receives information regarding a location of a firearm. The location can correspond to a current location of the firearm, a previous location of the firearm, and so forth. For example, a location as determined above can be received by the location service module 110, the location service 112, and so forth.

Step 504 compares the location of the firearm to a designated authorized location. In various embodiments, one or more designated authorized locations can be identified, such as by the GPS coordinates of each location, and stored. Thus, the location of the firearm can be compared to multiple different authorized locations. For example, the location service 112 can compare the information received from the transmitter with stored information regarding one or more designated authorized locations. The designated authorized locations may be identified by a user via a web application or other means and stored by the location service 112.

Step 506 ascertains whether the location of the firearm is within the authorized location.

If the location of the firearm is within an authorized location, (Yes") the method returns to block 502 to continue monitoring locations of the firearm.

If, however, the current location of the firearm is not within an authorized location ("No"), step 508 transmits an alert to a user's device. The alert can be in the form of a text message (SMS or MMS), an email, a call, or other form. In various embodiments, the alert can be received by the location service module 110 on the user's device and can cause a notification to be displayed or otherwise presented to the user. In some embodiments, information regarding the location of the firearm can be transmitted along with the alert or in addition to the alert.

Step 510 receives information regarding one or more subsequent locations of the firearm. For example, the location service 112 can receive updated information regarding the location of the firearm as the firearm is moved from one location to another.

Step 512 transmits information regarding the subsequent locations to the user's device. For example, the location service 112 can provide information enabling the user to track the firearm as it is moved.

In various embodiments, the information regarding the subsequent locations is presented to a user as a bread crumb trail on a map illustrating the path of the firearm.

Having described various methods for techniques discussed herein, consider the following description of a device that can be used to implement one or more embodiments.

Figure 6:
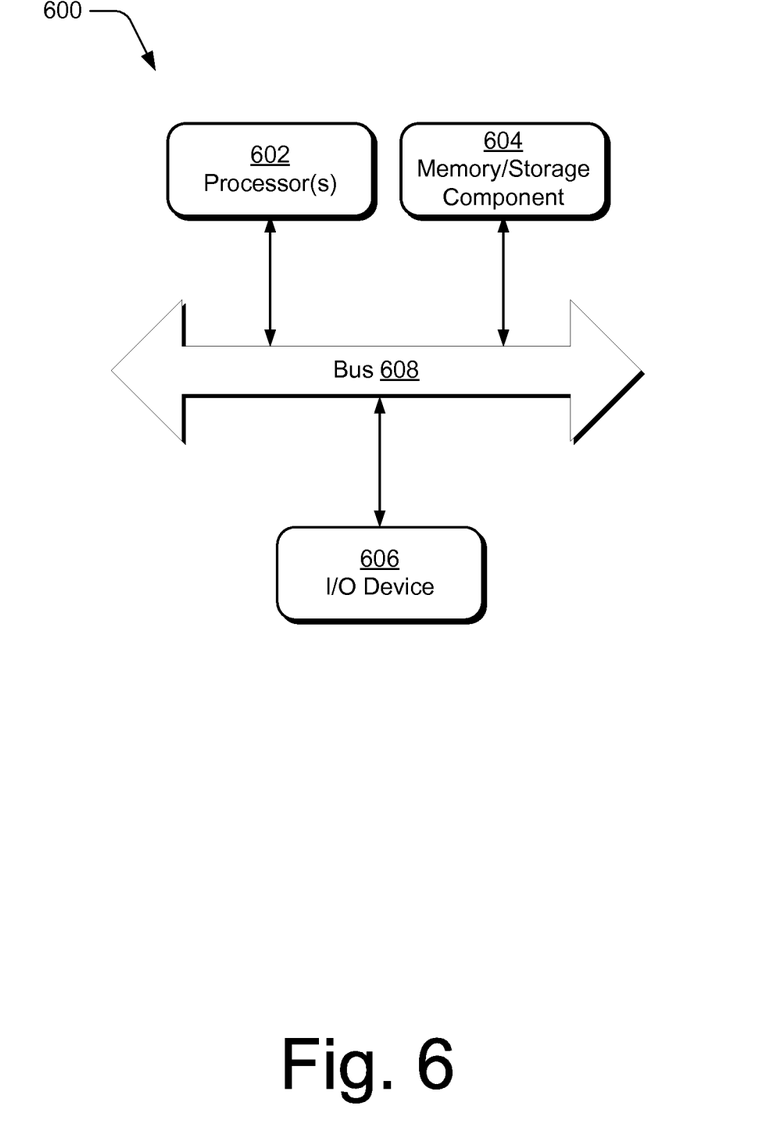
FIG. 6 illustrates an example device that can be used to implement one or more embodiments.

FIG. 6 illustrates an example device 600 that can be used to implement one or more embodiments described above.

Device 600, for example, can represent an implementation of the client device 104 and/or the location service 112 of FIG. 1.

Device 600 includes one or more processors 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 may be wired or wireless.

Memory/storage component 604 represents one or more computer-readable storage media. Memory/storage component 604 can include volatile media (such as random access memory (RAM)) and/or nonvolatile media (such as read only memory (ROM), flash memory, optical disks, magnetic disks, and so forth). Component 604 can include fixed media (e.g., RAM, ROM, a fixed hard drive, etc.) as well as removable media (e.g., a flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a touch screen, a microphone, and so forth. Examples of output devices include a display device (e.g., a screen on a mobile phone), speakers, a network card, cellular network components, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer-readable storage media refer to media and/or devices that enable persistent storage of information in contrast to mere signal transmission, carrier waves, or signals per se. Thus, computer-readable storage media do not include signals per se.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A location device associated with a firearm and configured to perform operations comprising:
    determining a current location of the firearm via the location device, the location device being at least one of attached to or positioned within the firearm;
    transmitting information regarding the current location of the firearm from the location device directly to a mobile device;
    displaying one or more notifications on the mobile device indicating the current location of the firearm; and
    displaying a breadcrumb trail on the mobile device that includes the current location of the firearm and one or more other locations of the firearm.

2. The firearm of claim 1, wherein the location device is a Global Positioning System (GPS) receiver coupled to a transmitter.

3. The firearm of claim 1, wherein the location device is configured to be positioned within a dummy round of ammunition.

4. The firearm of claim 1, wherein the location device is configured to be embedded in a grip of the firearm.

5. One or more computer-readable storage media storing instructions that are executable by a remote device to cause the remote device to perform operations comprising:
    receiving, at the remote device, information regarding at least one location designated as an authorized location for a firearm, the remote device being remote from the firearm;
    receiving, at the remote device, information regarding a current location of the firearm, the information regarding the current location of the firearm being transmitted to the remote device directly from a location device that is at least one of attached to or positioned within the firearm;
    comparing, at the remote device, the current location of the firearm to the at least one location designated as an authorized location;
    responsive to determining that the current location of the firearm is outside of the authorized location, generating an alert; and
    causing a bread crumb trail that includes the current location and one or more other locations of the firearm to be displayed on a map.

6. The one or more computer-readable storage media of claim 5, wherein the alert comprises a visual alert, the operations further comprising:
    causing the visual alert to be output by causing the visual alert to be displayed on a display of the remote device.

7. The one or more computer-readable storage media of claim 5, wherein the alert comprises a vibratory alert, the operations further comprising:
    causing the vibratory alert to be output by causing the remote device to vibrate.

8. The one or more computer-readable storage media of claim 5, wherein the alert comprises an auditory alert, the operations further comprising:
  causing the auditory alert to be output by causing the remote device to output a sound.

9. The one or more computer-readable storage media of claim 5, the operations further comprising:
  transmitting, to a client device, the alert as a text message.

10. The one or more computer-readable storage media of claim 5, the operations further comprising:
  receiving information regarding one or more subsequent locations of the firearm.

11. The one or more computer-readable storage media of claim 10, the operations further comprising:
  outputting the received information regarding the one or more subsequent locations of the firearm as part of the bread crumb trail.

12. The one or more computer-readable storage media of claim 5, wherein the operations further comprise:
  receiving a selection of a control to disable a tracking functionality for tracking the firearm;
  responsive to receiving selection of the control, presenting an authentication procedure; and
  responsive to a successful authentication via the authentication procedure, disabling the tracking functionality.

13. The one or more computer-readable storage media of claim 5, wherein the operations further comprise:
  receiving a selection of a control to set at least one of approved locations or disapproved locations for the firearm; and
  responsive to receiving selection of the control, presenting a user interface that enables at least one of approved locations or disapproved locations to be set for the firearm.

14. The one or more computer-readable storage media of claim 5, wherein the operations further comprise:
  receiving a selection of a control to configure a user account for a tracking functionality for tracking the firearm; and
  responsive to receiving selection of the control, presenting a user interface that enables the user account to be configured.

15. The one or more computer-readable storage media of claim 5, wherein the operations further comprise presenting historical notifications regarding the firearm.

16. The one or more computer-readable storage media of claim 5, wherein the operations further comprise:
  receiving a selection of a control for initiating one or more system test procedures for a firearm tracking system that includes the remote device; and
  generating, in response to said receiving, an out of zone test event that simulates a signal corresponding to the firearm being detected outside of an authorized zone defined for the firearm.

17. A location device associated with a firearm and configured to perform operations comprising:
  determining a current location of the firearm via the location device, the location device being at least one of attached to or positioned within the firearm;
  transmitting information regarding the current location of the firearm from the location device directly to a mobile device, the information being transmitted from the location device via at least one of a text message, a short message service (SMS) message, a mixed media signal (MMS) message, or an email; and
  causing the current location of the firearm to be displayed on the mobile device as part of a breadcrumb trail that includes the current location of the firearm and one or more other locations of the firearm.

18. The location device of claim 17, wherein the location device is a Global Positioning System (GPS) receiver coupled to a transmitter.

19. The location device of claim 17, wherein the location device is configured to be positioned within a dummy round of ammunition.

20. The location device of claim 17, wherein the location device is configured to be embedded in a grip of the firearm.

* * * * *